United States Patent
Yi et al.

(10) Patent No.: US 9,882,268 B2
(45) Date of Patent: Jan. 30, 2018

(54) RADIATOR FRAME HAVING ANTENNA PATTERN EMBEDDED THEREIN AND METHOD OF MANUFACTURING THE SAME

(71) Applicant: Samsung Electro-Mechanics Co., Ltd., Suwon-si (KR)

(72) Inventors: Jun Seung Yi, Suwon-si (KR); Ye Ji Park, Suwon-si (KR); Sun Hee Lee, Suwon-si (KR); Hyeon Gil Nam, Suwon-si (KR); Nam Ki Kim, Suwon-si (KR); Su Hyun Kim, Suwon-si (KR); Ha Ryong Hong, Suwon-si (KR); Sung Eun Cho, Suwon-si (KR); Dae Seong Jeon, Suwon-si (KR); Ho Jin Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 150 days.

(21) Appl. No.: 14/830,192

(22) Filed: Aug. 19, 2015

(65) Prior Publication Data
US 2016/0056529 A1 Feb. 25, 2016

(30) Foreign Application Priority Data

Aug. 21, 2014 (KR) .................. 10-2014-0109104
Jan. 21, 2015 (KR) .................. 10-2015-0009849

(51) Int. Cl.
*H01Q 1/24* (2006.01)
*H01Q 1/38* (2006.01)
(Continued)

(52) U.S. Cl.
CPC ............. *H01Q 1/243* (2013.01); *H01Q 5/371* (2015.01); *H01Q 9/42* (2013.01); *B29C 45/14639* (2013.01); *B29L 2031/3481* (2013.01)

(58) Field of Classification Search
CPC .......... H01Q 1/243; H01Q 1/38; H01Q 5/371; H01Q 9/42; H01Q 1/12
(Continued)

(56) References Cited

U.S. PATENT DOCUMENTS

2002/0080077 A1* 6/2002 Kamei ................ B29C 45/0046
343/700 MS
2002/0105479 A1* 8/2002 Hamada .............. B29C 45/1671
343/895

(Continued)

FOREIGN PATENT DOCUMENTS

CN 1363967 A 8/2002
CN 10115476 A 4/2008
(Continued)

OTHER PUBLICATIONS

Chinese Office Action dated Nov. 17, in the corresponding Chinese Patent Application No. 201510520282.2. (26 pages in English and 12 pages in Chinese).

*Primary Examiner* — Tho G Phan

(57) ABSTRACT

A radiator frame having an antenna radiator formed on a surface thereof and a method of manufacturing the same are provided. The radiator frame includes: a radiator including an antenna pattern portion configured to transmit or receive a signal, and a connection terminal portion configured to electrically connect the antenna pattern portion and a circuit board; and a molding frame connected to the radiator such that the antenna pattern portion is exposed at one surface of the molding frame and the connection terminal portion is exposed at another surface of the molding frame opposing (Continued)

the one surface of the molding frame. The connection terminal portion may include a plated layer exposed at the other surface of the molding frame to contact the circuit board.

12 Claims, 13 Drawing Sheets

(51) Int. Cl.
    *H01Q 9/42*           (2006.01)
    *H01Q 5/371*         (2015.01)
    *B29L 31/34*         (2006.01)
    *B29C 45/14*         (2006.01)

(58) Field of Classification Search
    USPC .......................... 343/700 MS, 702, 872, 873
    See application file for complete search history.

(56) References Cited

U.S. PATENT DOCUMENTS

| | | | |
|---|---|---|---|
| 2007/0103371 A1* | 5/2007 | Kim | H01Q 1/243 343/702 |
| 2008/0074335 A1 | 3/2008 | Suh | |
| 2009/0058737 A1 | 3/2009 | Tsujimura et al. | |
| 2009/0289856 A1 | 11/2009 | Cho et al. | |
| 2010/0012530 A1 | 1/2010 | Watanabe et al. | |
| 2011/0030198 A1 | 2/2011 | Lee et al. | |
| 2011/0316754 A1* | 12/2011 | Nam | H01Q 1/243 343/702 |
| 2012/0032858 A1* | 2/2012 | Chang | B29C 45/1671 343/702 |
| 2012/0039050 A1* | 2/2012 | Chang | B29C 45/1671 361/749 |
| 2012/0168517 A1* | 7/2012 | Lee | H01Q 1/243 235/492 |
| 2012/0218727 A1 | 8/2012 | Kim | |

FOREIGN PATENT DOCUMENTS

| | | |
|---|---|---|
| CN | 101997156 A | 3/2011 |
| CN | 102377012 A | 3/2012 |
| CN | 102651963 A | 8/2012 |
| CN | 102655260 A | 9/2012 |
| CN | 202564533 U | 11/2012 |
| EP | 2 421 089 A2 | 2/2012 |
| EP | 1 221 738 A2 | 7/2012 |
| KR | 10-2009-0035636 A | 4/2009 |
| KR | 10-0995470 B1 | 11/2010 |
| KR | 10-2012-0114100 A | 10/2012 |
| KR | 10-2014-0039665 A | 4/2014 |

* cited by examiner

RADIATOR FRAME HAVING ANTENNA PATTERN EMBEDDED THEREIN AND METHOD OF MANUFACTURING THE SAME

CROSS-REFERENCE TO RELATED APPLICATION(S)

This application claims the benefit under 35 USC 119(a) of Korean Patent Application No. 10-2014-0109104 filed on Aug. 21, 2014 and Korean Patent Application No. 10-2015-0009849 filed on Jan. 21, 2015, in the Korean Intellectual Property Office, the entire disclosure of which is incorporated herein by reference for all purposes.

BACKGROUND

1. Field

The following description relates to a radiator frame having an antenna radiator formed on the surface thereof and a method of manufacturing the same.

2. Description of Related Art

Mobile communications terminals such as mobile phones, PDAs, GPS navigation devices, laptop computers, and the like, which support wireless communications, are necessities in modern society. Mobile communications terminals have been developed to allow for communications to be undertaken using schemes such as CDMA, wireless LAN, GSM, DMB, and the like. One of the most important components that enables these schemes is an antenna.

The antenna used in a mobile communications terminal has evolved from an exterior type antenna such as a rod antenna or a helical antenna to an internal type antenna mounted in the terminal.

There have been problems in mobile communications terminals due to the exterior type antenna being vulnerable to external impacts and the interior type antenna increasing the volume of the terminal.

In order to solve these problems, research into integrating the mobile communications terminal with the antenna has been actively conducted.

A method in which a radiator frame is formed using a radiator formed through injection-molding has been used in the related art.

However, when the radiator has been injection-molded, since painting is undertaken after the injection molding, a terminal part of the radiator may also be partially painted by overspray of paint during the painting, and as a result, a contact failure between the terminal part and a substrate may occur.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a radiator frame may include: a radiator including an antenna pattern portion configured to transmit or receive a signal, and a connection terminal portion configured to electrically connect the antenna pattern portion and a circuit board; and a molding frame connected to the radiator such that the antenna pattern portion is exposed at one surface of the molding frame and the connection terminal portion is exposed at another surface of the molding frame opposing the one surface of the molding frame. The connection terminal portion may include a plated layer exposed at the other surface of the molding frame to contact the circuit board.

The radiator may include a coating layer on the antenna pattern portion, wherein the coating layer is exposed at one surface of the molding frame.

The plated layer may be constructed of metallic material having conductivity.

The radiator may have a 3D structure bent to form the antenna pattern portion and the connection terminal portion, and the coating layer may be disposed on an entirety of a first surface of the radiator including an exposed surface of the antenna pattern portion that is exposed at the one surface of the molding frame.

The radiator may have a 3D structure bent to form the antenna pattern portion and the connection terminal portion, and the coating layer may be disposed on an entirety of a first surface of the radiator including an exposed surface of the antenna pattern portion that is exposed at the one surface of the molding frame.

The radiator may include a connection portion extending from one end of the antenna pattern portion and connected to the connection terminal portion. One end of the connection portion may be bent to one side of the antenna pattern portion, and the connection terminal portion may be bent outwardly from another end of the connection portion in a direction opposite to a direction in which the antenna pattern portion is provided.

The radiator may include a connection portion extending from one end of the antenna pattern portion and connected to the connection terminal portion. One end of the connection portion may be bent to one side of the antenna pattern portion and the connection terminal portion may be bent outwardly from another end of the connection portion, externally, such that the connection terminal portion does not include a portion facing the antenna pattern portion.

A painting liquid of a same material as a material of the coating layer may be interposed between the connection terminal portion and the plated layer.

The radiator may have a 3D structure bent to form the antenna pattern portion and the connection terminal portion, and the radiator may include the coating layer only on an exposed surface of the antenna pattern portion exposed at the one surface of the molding frame.

The radiator may have a 3D structure bent to form the antenna pattern portion, the connection terminal portion, and a connection portion connecting the antenna pattern portion and the connection terminal portion. The coating layer may be disposed on at least a portion of the antenna pattern portion and the connection terminal portion, and the coating layer may be mostly disposed on a portion of the antenna pattern portion exposed at the one surface of the molding frame.

The radiator may have a 3D structure bent to form the antenna pattern portion and the connection terminal portion, and the radiator may include the plated layer only on an exposed surface of the connection terminal portion exposed at the other surface of the molding frame.

The radiator may include a connection portion extending from one end of the antenna pattern portion and connected to the connection terminal portion. One end of the connection portion may be bent to one side of the antenna pattern portion and the connection terminal portion may be bent inwardly from another end of the connection portion in a direction in which the antenna pattern portion is provided.

The radiator may include a connection portion extending from one end of the antenna pattern portion and connected to the connection terminal portion. One end of the connection portion may be bent to one side of the antenna pattern portion and the connection terminal portion may be bent in an inner side from another end of the connection portion to oppose the antenna pattern portion.

According to another general aspect, a method of manufacturing a radiator frame may include: providing a radiator base substrate and painting a portion of one surface of the radiator base substrate; plating a residual portion of the one surface of the radiator base substrate; providing a radiator by stamping the radiator base substrate to form an antenna pattern portion configured to transmit or receive an external signal, and a connection terminal portion configured to electrically connect the antenna pattern portion and a circuit board; placing the radiator in an internal space of a mold; and filling the internal space with a resin material such that the antenna pattern portion is molded in a molding frame.

The connection terminal portion may include the plated residual portion of the radiator base substrate.

According to yet another general aspect, a method of manufacturing a radiator frame may include: painting a first surface of a radiator base substrate; plating a second surface of the radiator base substrate, wherein the second is opposite the first surface; providing a radiator by stamping the radiator base substrate to form an antenna pattern portion configured to transmit or receive a signal, a connection terminal portion configured to electrically connect the antenna pattern portion and a circuit board; placing the radiator in an internal space of a mold; and filling the internal space with a resin material such that the antenna pattern portion is molded in a molding frame.

The connection terminal portion may include the plated second surface of the radiator base substrate.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
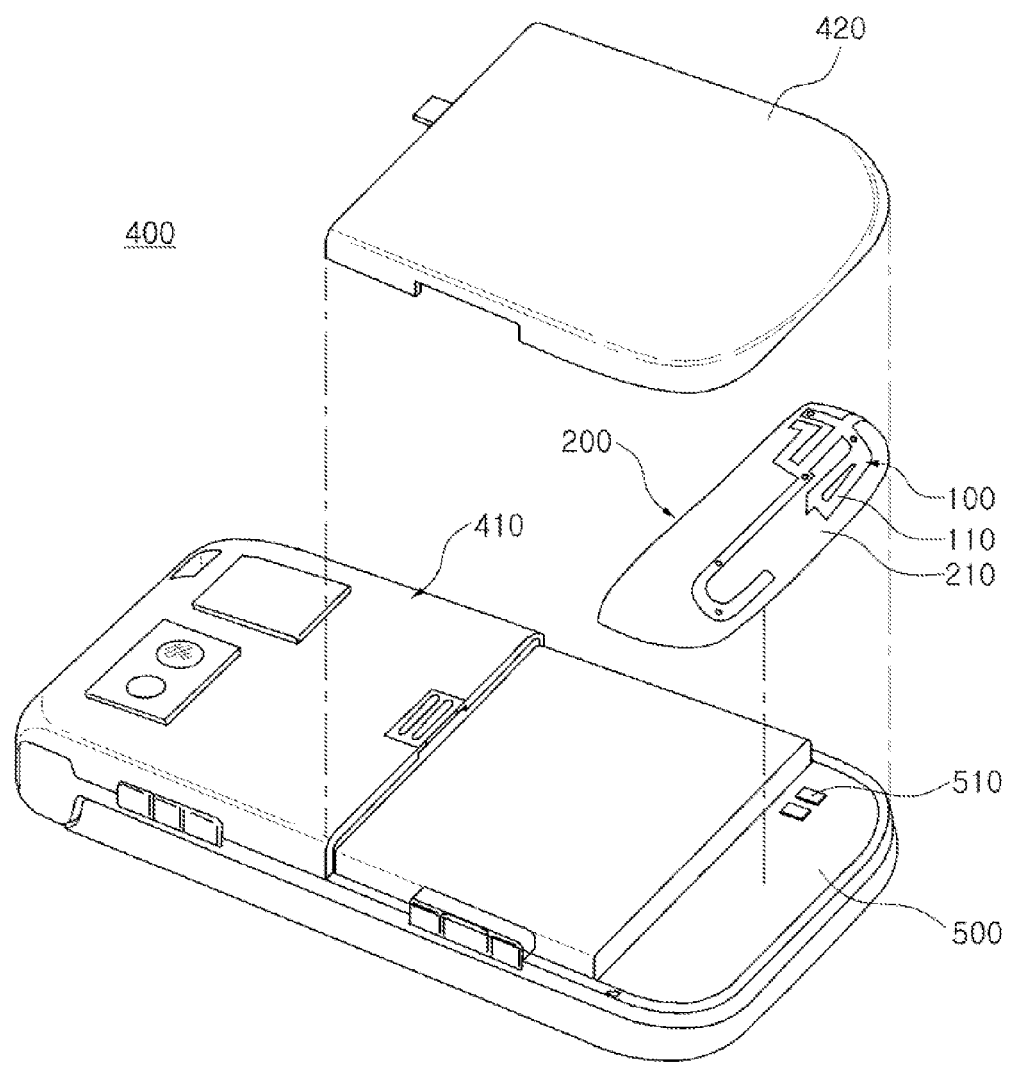
FIG. 1 is a schematic perspective view illustrating an example of a mobile communications terminal in which a radiator frame is coupled to a case of the terminal.
Figure 2:
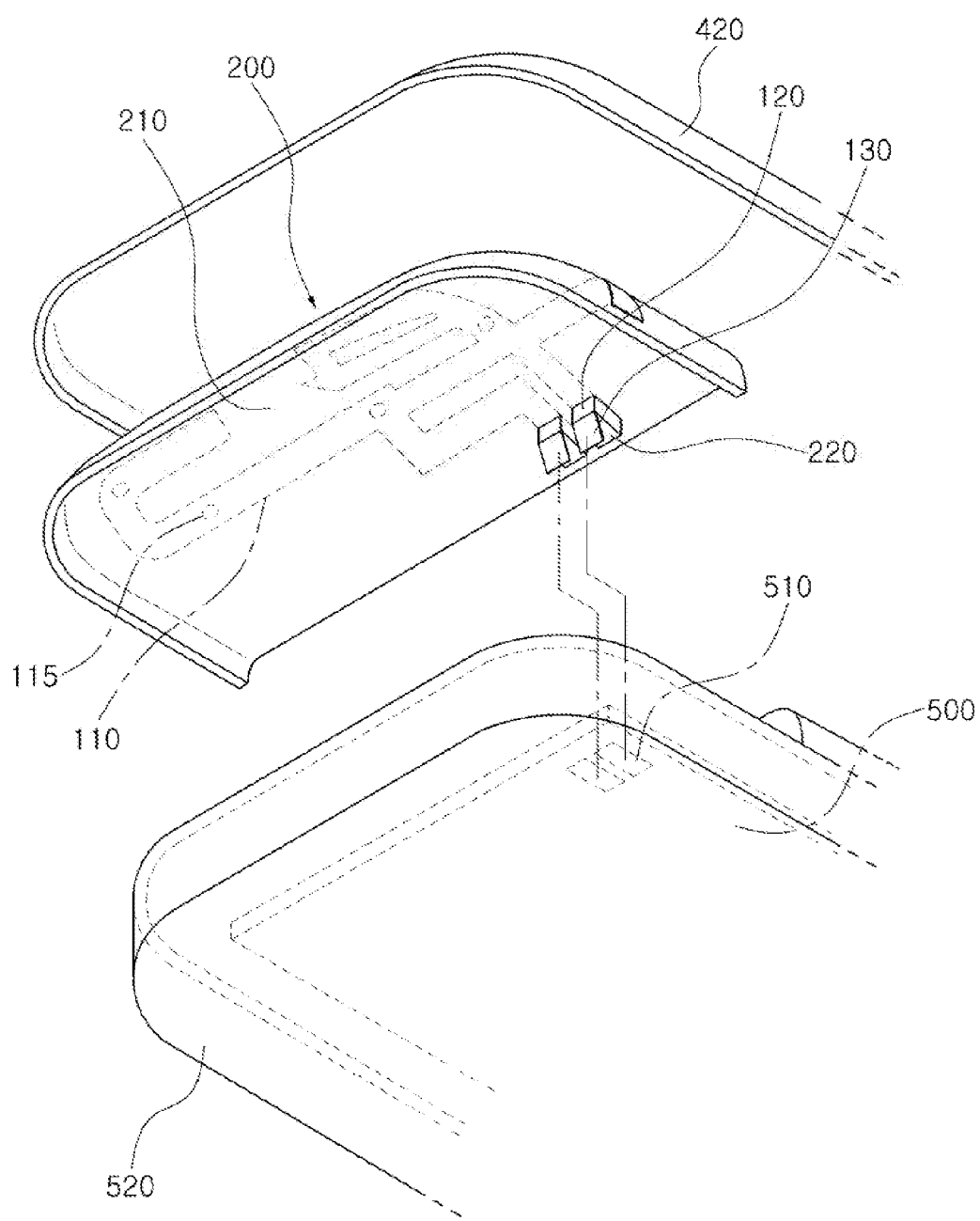
FIG. 2 is an exploded perspective view of an example of the mobile communications terminal manufactured by using the radiator frame.

FIG. 1 is a schematic perspective view illustrating a mobile communications terminal 400 in which a radiator frame 200 is coupled to a case 410 of the mobile communications terminal 400, according to an example embodiment. FIG. 2 is an exploded perspective view of the mobile communications terminal 400 manufactured by using the radiator frame 200. Although a mobile communications terminal 400 is shown in described, the radiator frame 200 may be provided in or coupled to another type of electronic apparatus.

Referring to FIGS. 1 and 2, the mobile communications terminal 400, which is an electronic apparatus, may include a case 410 forming an external shape of the terminal 400, and a battery cover 420 covering a battery mounted part 412 and a radiator frame 200. The radiator frame 200 may be formed by embedding the radiator 100 in a molding frame 210, and the radiator 100 may include a connection terminal portion 130 and an antenna pattern portion 110.

Figure 3:
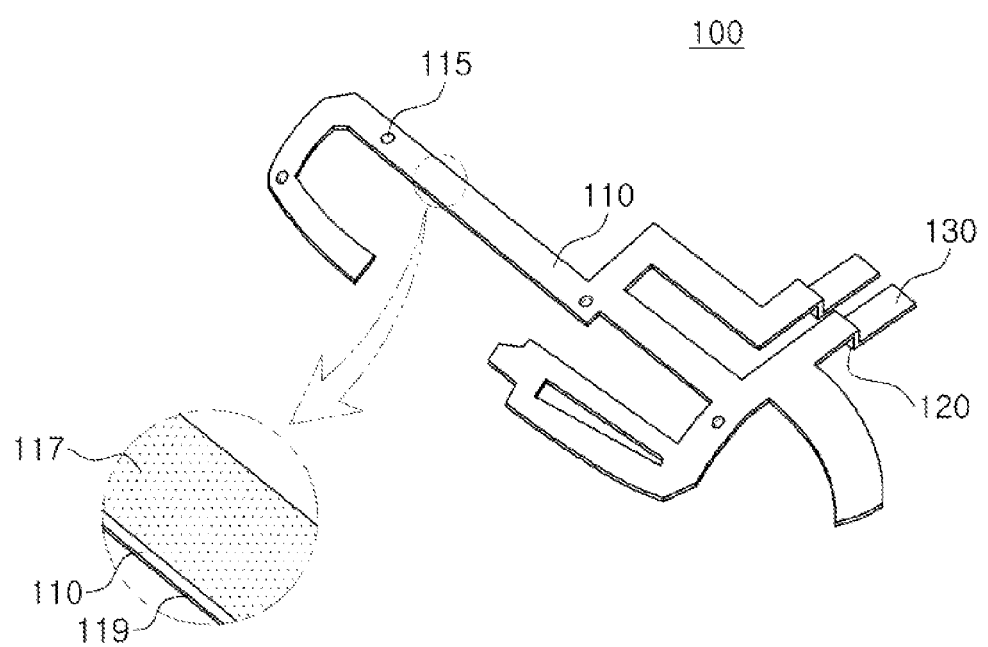
FIG. 3 is a schematic perspective view illustrating an example of a radiator provided in the radiator frame.

Further, referring to FIG. 3, a coating layer 117 may be formed on a first surface of the radiator 100, and a plated layer 119 may be formed on a second surface of the radiator 100 opposing the first surface of the radiator 100.

Referring again to FIGS. 1 and 2, the radiator 100 may include the connection terminal portion 130 for connection with a terminal 510 of a circuit board 500. The connection terminal portion 130 may be connected to the terminal 510 of the circuit board 500 to enable antenna performance of the radiator frame 200 to be implemented in the mobile communications terminal 400 when the radiator frame 200 is mounted on the mobile communications terminal 400. In addition, the second surface on which the plated layer 119 is formed in the radiator 100 is implemented to contact the circuit board 500.

The connection terminal portion 130 may elastically contact the terminal 510 in order to provide a reliable, secure connection with the terminal 510. However, the connection terminal portion 130 is not limited to the example structure illustrated in FIG. 2, and the connection terminal portion 130 may have any structure in which the connection terminal portion 130 may contact the terminal 510.

The antenna pattern portion 110 may be mounted on the mobile communications terminal 400, and may be externally exposed in the embodiment of FIGS. 1 and 2 if the antenna pattern portion 110 is not covered with the battery cover 420. Therefore, the coating layer 117 (see FIG. 3) is formed on the antenna pattern portion 110 of the radiator frame 200.

Since the radiator frame 200 is not externally exposed when the radiator frame 200 is covered with the battery cover 420, there is no problem regarding external exposure of the antenna pattern 110 while the battery cover 420 is closed on the case 410. However, since the antenna pattern portion 110 is externally exposed when the battery cover 420 is opened in order to replace a battery, the coating layer 117 is formed so as to protect the antenna pattern portion 110 when the battery cover 420 is opened, and in this case is considered an exterior design.

FIG. 3 is a schematic perspective view illustrating the radiator 100 provided in the radiator frame 200, according to an example embodiment.

Referring to FIG. 3, the radiator 100 may include the antenna pattern portion 110, a connection portion 120, and the connection terminal portion 130. Moreover, the coating layer 117 may be formed on the first surface of the radiator, and the plated layer 119 may be formed on the second surface of the radiator. The coating layer 117 may be formed, for example, by applying a painting liquid or coating liquid which has a color the same as or similar to an exterior color of the mobile communications terminal 400 onto one surface of a base substrate before the radiator 100 is formed. In addition, the plated layer 119 may be formed by plating at least any one of nickel and gold on the other surface of the base substrate. The coating layer 117 and the plated layer 119 may be formed on the base substrate and thereafter stamped in a shape of the radiator 100.

For example, the radiator frame 200 may be manufactured by injection-molding the radiator 100. The radiator 100, when installed in the radiator frame 200, may be configured such that the antenna pattern portion 110 transmits or receives an external signal to or from a remote device or system, and the connection terminal portion 130 transmits or receives the signal to or from the circuit board 500 of the mobile communications terminal 400.

The radiator 100 is constructed of a conductor such as aluminum or copper to receive an external signal and transfer the received external signal to a signal processing device of the mobile communications terminal 400, such as the mobile communications terminal 400. Further, the antenna pattern portion 110 may form a meander line in order to receive external signals in various bands.

In addition, the radiator 100 has a 3D structure that is bent so as to form the antenna pattern portion 110, the connection terminal portion 130, and the connection portion 120 connecting the antenna pattern portion 110 and the connection terminal portion 130.

The radiator 100 may be configured such that the antenna pattern portion 110 receives the external signal and the connection terminal portion 130 contacts the circuit board 500 of the electronic apparatus so as to transmit the external signal to the mobile telecommunications terminal 400.

Figure 5:
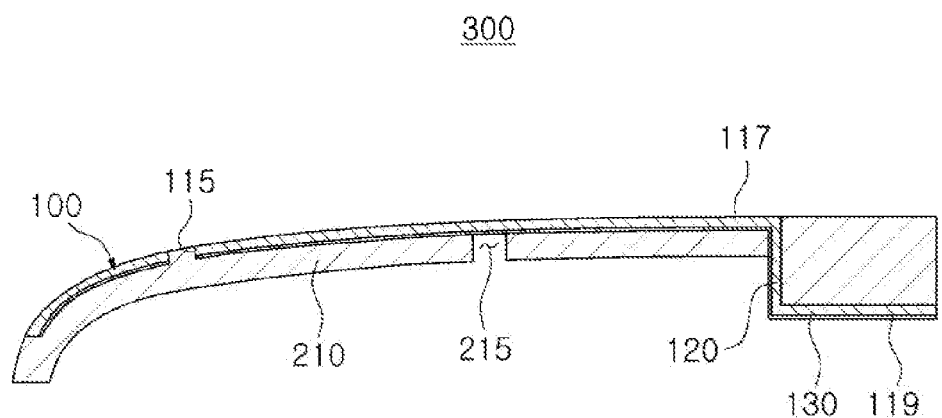
FIG. 5 is a schematic cross-sectional view taken along line A-A' of FIG. 4.

A guide pin hole 115 may be formed in the antenna pattern portion 110. A guide pin 328 (see FIG. 6) of a manufacturing mold 300 may be positioned at the guide pin hole 115 during the injection-molding to prevent the radiator 100 from moving during injection. In addition, the guide pin hole 115 may retreat in a direction of the arrow illustrated in FIG. 6 under influence of the pressure of the injection liquid during the injection, and as a result, as illustrated in FIG. 5, the resin material is even provided in the guide pin hole 115 to form a molding frame 210.

Further, the radiator 100 may be provided with the 3D structure by bending each of the antenna pattern portion 110, the connection terminal portion 130, and the antenna pattern portion 110, and the connection terminal portion 130 may be connected by the connection portion 120. The connection portion 120 may connect the antenna pattern portion 110 and the connection terminal portion 130 so that the antenna pattern portion 110 is formed on a first surface 210a (FIG. 4) of the molding frame 210 and the connection terminal portion 130 is formed on a second surface 210b (FIG. 4) of the molding frame 210 that is opposite the first surface of the molding frame 210.

The first surface of the radiator 100 on which the coating layer 117 is formed is exposed at the first surface 210a of the molding frame 210. For instance, since the radiator 100 is externally exposed when the battery cover 420 is opened for the replacement of a battery, or the like, the coating layer 117 may be formed on the first surface of the radiator 100 for the exterior design while protecting the exposed radiator 100 from contamination. In addition, the coating layer 117 may have the same color as the molding frame 210.

Further, the plated layer 119 plated with at least any one of nickel and gold may be formed on the second surface of the radiator 100. There is a concern that the painting liquid or coating liquid for the coating layer 117 may be scattered onto a portion of the second surface during forming of the coating layer 117, and when the portion of the second surface onto which the painting liquid or coating liquid is later formed as the terminal connection portion 130, a reliability problem such as occurrences of a contact failure with the substrate, or the like, may occur. Therefore, in an example embodiment, the coating layer 117 is formed on the first surface of the radiator 100, and thereafter the plated layer 119 is formed on the opposing second surface of the radiator 100. As a result, the second surface of the radiator 100 does not include any material of the coating layer 117 and is made entirely of a conductor.

The connection portion 120 may allow the antenna pattern portion 110 and the connection terminal portion 130 to be configured on different planes, and allow the connection terminal portion 130, which is not embedded in the antenna pattern portion 110 (see FIG. 5), to be exposed on another surface opposing a surface on which the antenna pattern portion 110 is formed.

In this case, the radiator 100 may be configured in such a manner that the antenna pattern portion 110 is positioned at the first surface 210a of the molding frame 210 and the connection terminal portion 130 is positioned at the second surface 210b of the molding frame 210 based on the connection portion 120. For example, since the coating layer 117 is formed on the first surface of the radiator 100, and the plated layer 119 is formed on the opposing second surface of the radiator 100, the portion at which the coating layer 117 is formed is externally exposed from the mobile telecommunications terminal 400, and the plated layer 119 is intended to be disposed inside the mobile telecommunications terminal 400, for example, in a direction facing the substrate 500. Therefore, the radiator 100 may have a '⌐' shape as illustrated in FIG. 5.

The connection terminal portion 130 allows the signal received from the antenna pattern portion 110 to be transmitted to the circuit board 500 of the electronic apparatus, and may elastically connect the terminal 510 of the circuit board 500 in order to secure reliability of signal transmission.

Figure 4:
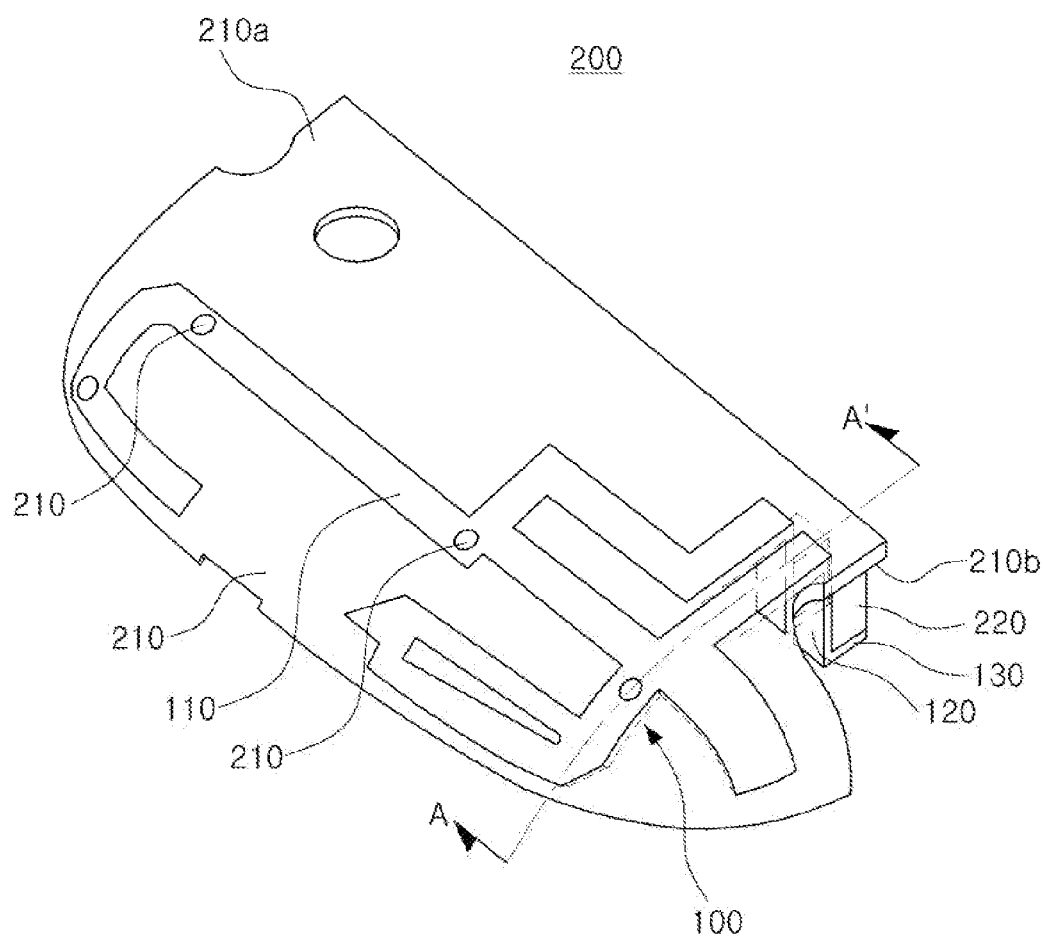
FIG. 4 is a schematic perspective view illustrating the radiator frame, according to an example.

FIG. 4 is a schematic perspective view illustrating the radiator frame 200, and FIG. 5 is a schematic cross-sectional view taken along line A-A' of FIG. 4.

Referring to FIGS. 4 and 5, the radiator frame 200 may include the radiator 100 and the molding frame 210. Since the configuration of the radiator 100 has been described in detail, the configuration of the radiator 100 will be omitted below.

The molding frame 210 may be manufactured by injection-molding the radiator 100. Further, the molding frame 210 is an injection structure, and the antenna pattern portion 110 may be exposed at the first surface 210a of the molding frame 210, and the connection terminal portion 130 may be exposed at the second surface 210b opposing the first surface 210a.

An example method of manufacturing the radiator frame 200, will be described in detail below.

Figure 6:
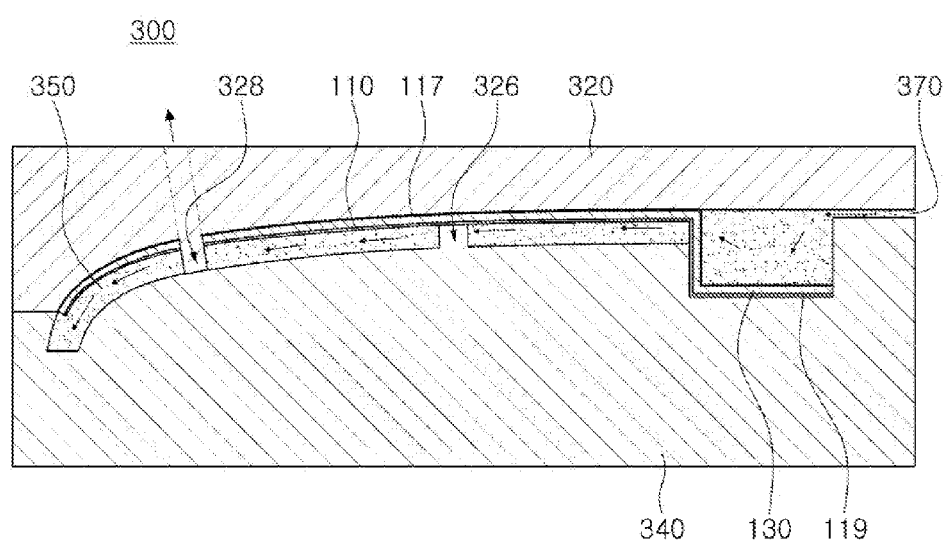
FIG. 6 is a schematic cross-sectional view illustrating an example of a shape in which the radiator is disposed between molds and embedded in a resin material in a method of manufacturing a radiator frame.
Figure 7:
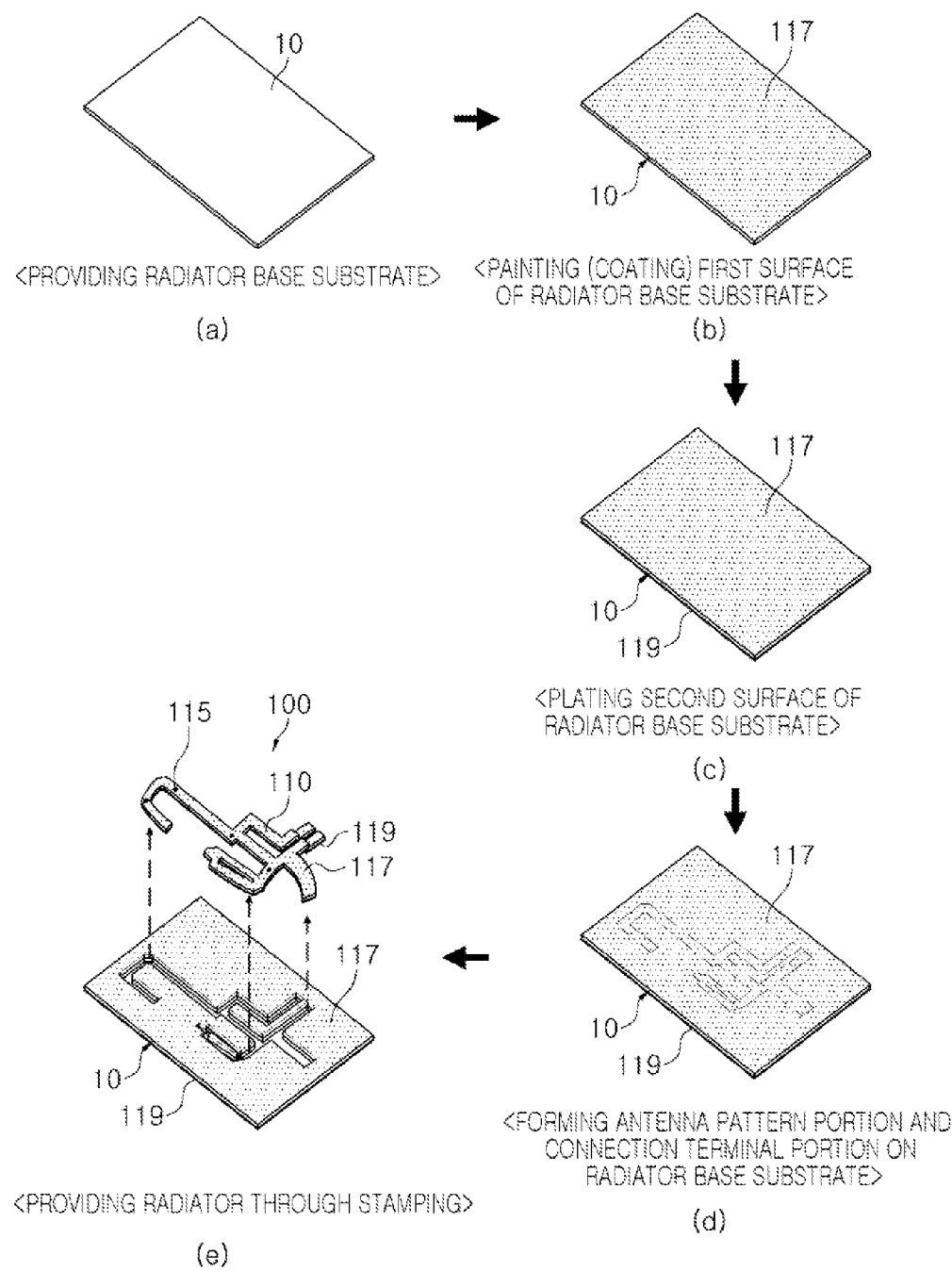
FIG. 7 is a schematic process diagram illustrating an example process of forming the radiator in the radiator frame.

FIG. 6 is a schematic cross-sectional view illustrating an example of a shape in which the radiator 100 disposed between molding portions 320 and 340, and embedded in a resin material in a method of manufacturing a radiator frame 200. FIG. 7 is a schematic process diagram illustrating a process of forming the radiator 100, according to an example embodiment.

Referring to FIGS. 6 and 7, an example method of manufacturing the radiator frame 200 includes: painting a first surface of a radiator base substrate 10; plating a second surface of the radiator base substrate 10 that opposes the first surface of the radiator base substrate 10; providing the radiator 100 by stamping the radiator base substrate 10 so that an antenna pattern portion 110 and the connection terminal portion 130 for electrically connecting the antenna pattern portion 110 and a circuit board are formed; placing the radiator 100 in an internal space 350 of an upper mold portion 320 and/or a lower mold portion 340; combining the upper mold portion 320 and the lower mold portion 340 to form the manufacturing mold 300; and injecting a resin material in the internal space 350 to form the molding frame 210, and embed the antenna pattern portion 110 in the molding frame 210 to form the radiator frame 200, which allows the antenna pattern portion 110 to be installed in the case 410 of the terminal 400. Aspects of the method of manufacturing the radiator frame 200 are described in greater detail below.

In the painting of the radiator base substrate 10, the radiator base substrate 10 may be held (fixed) onto a predetermined jig, and thereafter the coating layer 117 may be formed by jetting a painting liquid or a coating liquid onto a first surface of the radiator base substrate 10. In this case, it is desirable to form the coating layer 117 on only the first surface of the radiator base substrate 10. However, the painting liquid or coating liquid for forming the coating layer 117 may be easily scattered in a dust form, and as a result, the painting liquid or coating liquid may be partially applied onto the second surface of the radiator base substrate 10 opposing the first surface of the radiator base substrate 10. Therefore, the coating layer 117 is formed on the first surface of the radiator base substrate 10, and thereafter, the plated layer 119 is formed on a second surface of the radiator base substrate 10 opposing the first surface of the radiator base substrate. As a result, the second surface of the radiator base substrate 10 may have overall conductivity.

In addition, the radiator base substrate 10 may be painted with the same color as the molding frame 210. However, this is a design option, and the radiator base substrate 10 and the molding frame 210 may not be painted with the same color. For example, the radiator base substrate 10 and the molding frame 210 may be painted with different colors, or they may be colorless.

Next, the plated layer 119 made of at least one of nickel or gold or different metallic materials may be formed on the second surface of the radiator base substrate 10 having the coating layer 117. Therefore, in the painting of the radiator base substrate 10, although the coating liquid or painting liquid that forms the coating layer 117 may have been partially applied on the second surface of the radiator base substrate 10, the plated layer 119 covers the entirety of the corresponding surface and, as a result, the second surface of the radiator base substrate 10 has an overall conductivity provided by the plated layer 119.

The radiator 100 may be formed by stamping the radiator base substrate 10 that passes through the plating 119 so that the antenna pattern portion 110 transmitting or receiving an external signal and the connection terminal portion 130 electrically connecting the antenna pattern portion 110 and the circuit board 500 are formed.

Further, in stamping the radiator base substrate 10, the radiator 100 may be provided with a 3D structure by bending each of the antenna pattern portion 110 the connection terminal portion 130, and the antenna pattern portion 110 and the connection terminal portion 130 may be bent and connected by the connection portion 120.

After the radiator 100 is formed, the radiator 100 may be placed in the internal space 350 of the manufacturing mold 300.

The internal space 350 is formed by combining the upper mold 320 and the lower mold 340, and a groove formed at the upper mold 320 and/or the lower mold 340 may form the internal space 350 by combining the upper mold 320 and the lower mold 340.

When the upper mold portion 320 and the lower mold portion 340 are combined, the guide pin 328 formed at the upper mold portion 320 and the lower mold portion 340 passes through the guide pin hole 115 formed at the antenna pattern portion 110, and as a result, the radiator 100 may be fixed to the internal space 350. Moreover, the antenna pattern portion 110 may be additionally supported by a contact pin 326 formed at the upper mold portion 320 or the lower mold portion 340. Therefore, a support hole 215 may be formed in the radiator frame 200 which is completed afterwards (see FIG. 5).

Thus, according to the above description, the radiator frame 200 may be formed by injection-molding the molding frame 210 around the radiator 100. More specifically, the internal space 350 may be filled with the resin material so as to form the molding frame 210 with the antenna pattern portion 110 embedded therein. In this case, when the radiator 100 is mounted on the terminal 400, one surface of the radiator 100, (e.g., the first surface on which the coating layer 117 is formed) is exposed in an external direction (e.g., toward the first surface 210a of the molding frame 210), and the other surface of the radiator 100 (e.g., the second surface on which the plated layer 119 is formed) is exposed in an internal direction (e.g., toward the second surface 210b of the molding frame 210).

Figure 8:
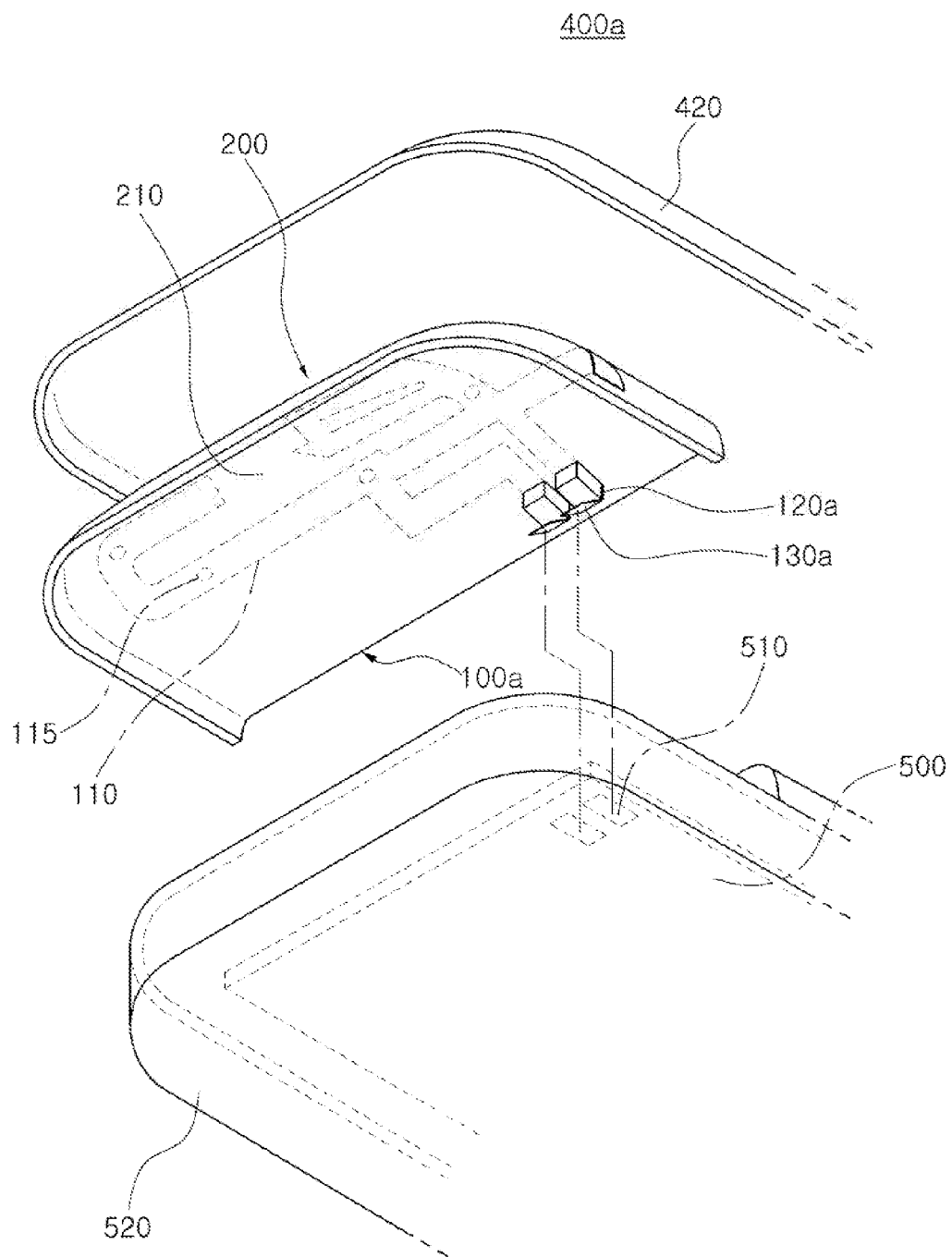
FIG. 8 is an exploded perspective view of an example of a mobile communications terminal manufactured by using a radiator frame, according to another example.

FIG. 8 is an exploded perspective view of a mobile communications terminal 400a manufactured by using a radiator frame 200a, according to another example embodiment. Although a mobile communications terminal 400a is shown in described, the radiator frame 200a may be provided in or coupled to another type of electronic apparatus.

In FIG. 8, the components of the mobile communications terminal 400a are generally the same as those shown and described with respect to the terminal 400 of FIG. 1 except for the configuration/shape in which a connection portion 120a and a connection terminal portion 130a of the radiator 100a of FIG. 8 are connected to (or disposed in) the antenna pattern portion 110. Hereinafter, differentiated parts of FIG. 8 will be primarily described, and residual parts are described as above.

Further, in another example embodiment, a coating layer 117a (see FIG. 9) may be formed on a first surface of the radiator 100a, and a plated layer 119a (see FIG. 9) may be formed on a residual portion of the first surface of the radiator 100a. Herein, the first surface is a surface of the radiator 100a which is continued; for instance, a surface which is continued even though the radiator 100a is bent. Since the coating layer 117a and the plated layer 119a are provided on the continued surface of the radiator 100a in FIG. 9, the coating layer 117a and the plated layer 119a are formed on the same surface.

Of course, a portion of the surface on which the plated layer 119a is formed faces the inside of the mobile communications terminal 400a, toward the circuit board 500. For instance, the portion of the surface on which the plated layer 119a is formed in the radiator 100a is configured to contact the circuit board 500.

Figure 9:
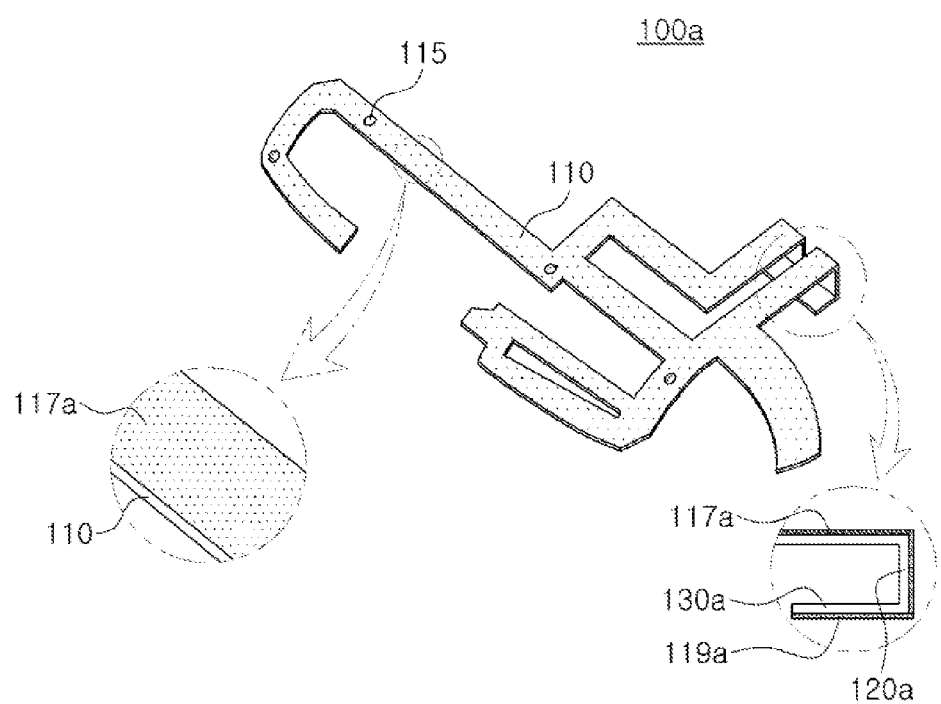
FIG. 9 is a schematic perspective view illustrating another example of a radiator provided in the radiator frame of FIG. 8.

FIG. 9 is a schematic perspective view illustrating a radiator 100a provided in a radiator frame 200a, according to another example embodiment.

Referring to FIG. 9, the radiator 100a may include the antenna pattern portion 110, the connection portion 120a, and the connection terminal portion 130a. Moreover, the coating layer 117a may be formed on a part of a first surface of the radiator 100a, and the plated layer 119a may be formed on the residual portion of the first surface of the radiator 100a. The coating layer 117a may be formed by partially applying the painting liquid or coating liquid which has a color which is the same as or similar to the exterior color of the mobile communications terminal 400a onto one surface of the base substrate before the radiator 100a is formed. In addition, the plated layer 119a may be formed by plating at least any one of nickel and gold on the residual portion of the one surface of the base substrate. The coating layer 117a and the plated layer 119a may be formed on the base substrate and thereafter be stamped in the shape of the radiator 100a.

The coating layer 117a may be formed at the antenna pattern portion 110 externally exposed from the mobile telecommunications terminal 400a on a first surface of the radiator 100a, and the portion where the coating layer 117a is formed may be exposed at the first surface 210a of the molding frame 210. For instance, since the radiator 100a is externally exposed when the battery cover 420 is opened for replacement of a battery, or the like, the coating layer 117a may form the exterior design while protecting the exposed radiator 100a from contamination. In addition, the coating layer 117a may have the same color as the molding frame 210.

Further, the plated layer 119a may be formed at the connection terminal portion 130a exposed to the inside of the mobile communications terminal 400a on the second surface of the radiator 100a. There is a concern that the painting liquid or coating liquid may be scattered onto another part of the radiator 100a on the first surface during formation of the coating layer 117a on a part of the first surface of the radiator 100, and when the other part of the radiator 100a is formed as the connection terminal portion 130a afterwards, reliability problems such as occurrences of contact failure with the substrate, or the like, may occur. Therefore, the coating layer 117a may be formed on a part of the first surface of the radiator 100a, and thereafter the plated layer 119a may be formed on the residual part of the first surface of the radiator 100a. As a result, the portion where the connection terminal portion 130a in the radiator 100a is formed is made of the conductor.

The connection portion 120a may allow the antenna pattern portion 110 and the connection terminal portion 130a to be configured on different planes and may allow the connection terminal portion 130a, which is not embedded in the antenna pattern portion 110, to be exposed on the second surface 210b of the molding frame 210 opposing first surface 210a of the molding frame 210 on which the antenna pattern portion 110 is formed. The coating layer 117a or the plated layer 119a may be formed on one surface of the connection portion 120a according to selection, or no layer may be formed on one surface of the connection portion 120a (the coating layer 117a is formed at the connection portion 120a in the embodiment of FIG. 9, but the connection portion 120a is not limited to such a configuration). Since the connection portion 120a is not externally exposed or exposed to the inside of the terminal 400a, but is instead hidden in the molding frame 210, the connection portion 120a may not be separately processed. However, the connection portion 120a may be processed for easy manufacturing during formation of the coating layer 117a or the plated layer 119a.

The radiator 100a may be configured in such a manner that the antenna pattern portion 110 is positioned at one side and the connection terminal portion 130a is positioned at the same side in relation to the connection portion 120a. For example, in such an embodiment, since the coating layer 117a is formed on a part of the first surface of the radiator 100a, and the plated layer 119a is formed on the residual portion of the first surface of the radiator 100a, the portion where the coating layer 117a is formed may be externally exposed from the mobile telecommunications terminal 400 when the battery cover 420 is removed, and the plated layer 119a is intended to be disposed inside the in the terminal 400. For example, the plated layer 119a may be exposed a direction such that it faces the substrate 500. Therefore, the radiator 100a may have a '⊐' shape as illustrated in FIG. 11.

Figure 10:
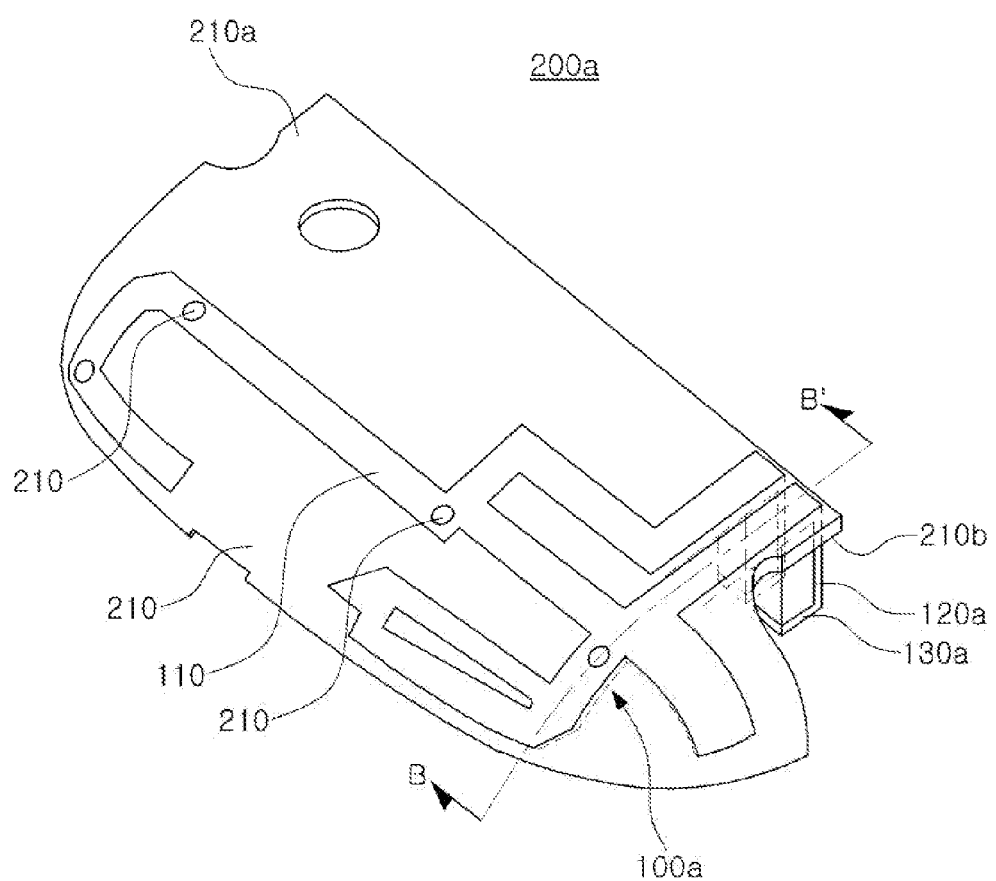
FIG. 10 is a schematic perspective view illustrating the radiator frame of FIG. 8.
Figure 11:
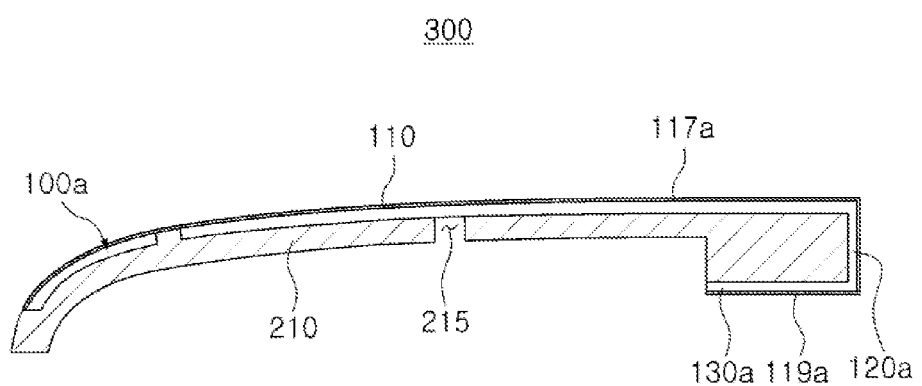
FIG. 11 is a schematic cross-sectional view taken along line B-B' of FIG. 10.

FIG. 10 is a schematic perspective view illustrating the radiator frame 200a according to another example embodiment, and FIG. 11 is a schematic cross-sectional view taken along line B-B' of FIG. 10.

Referring to FIGS. 10 and 11, the radiator frame 200a may include the radiator 100a and the molding frame 210.

The molding frame 210 may be manufactured by injection-molding the molding frame 210 around the radiator 100a. Hereinafter, the method of manufacturing the radiator frame 200a manufactured according to the various example embodiments will be described in detail.

Figure 12:
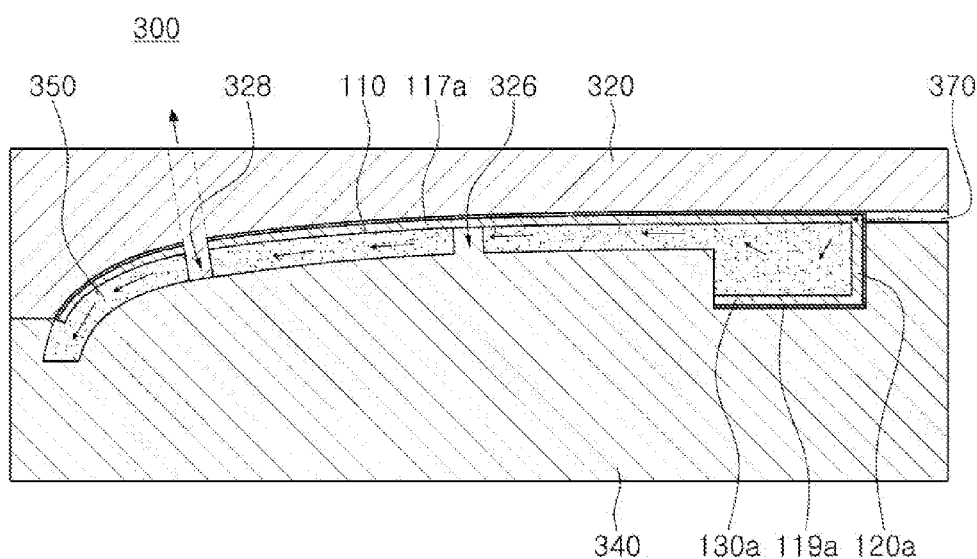
FIG. 12 is a schematic cross-sectional view illustrating an example of a shape in which the radiator of FIG. 9 is disposed between molds and embedded in a resin material in a method of manufacturing a radiator frame.
Figure 13:
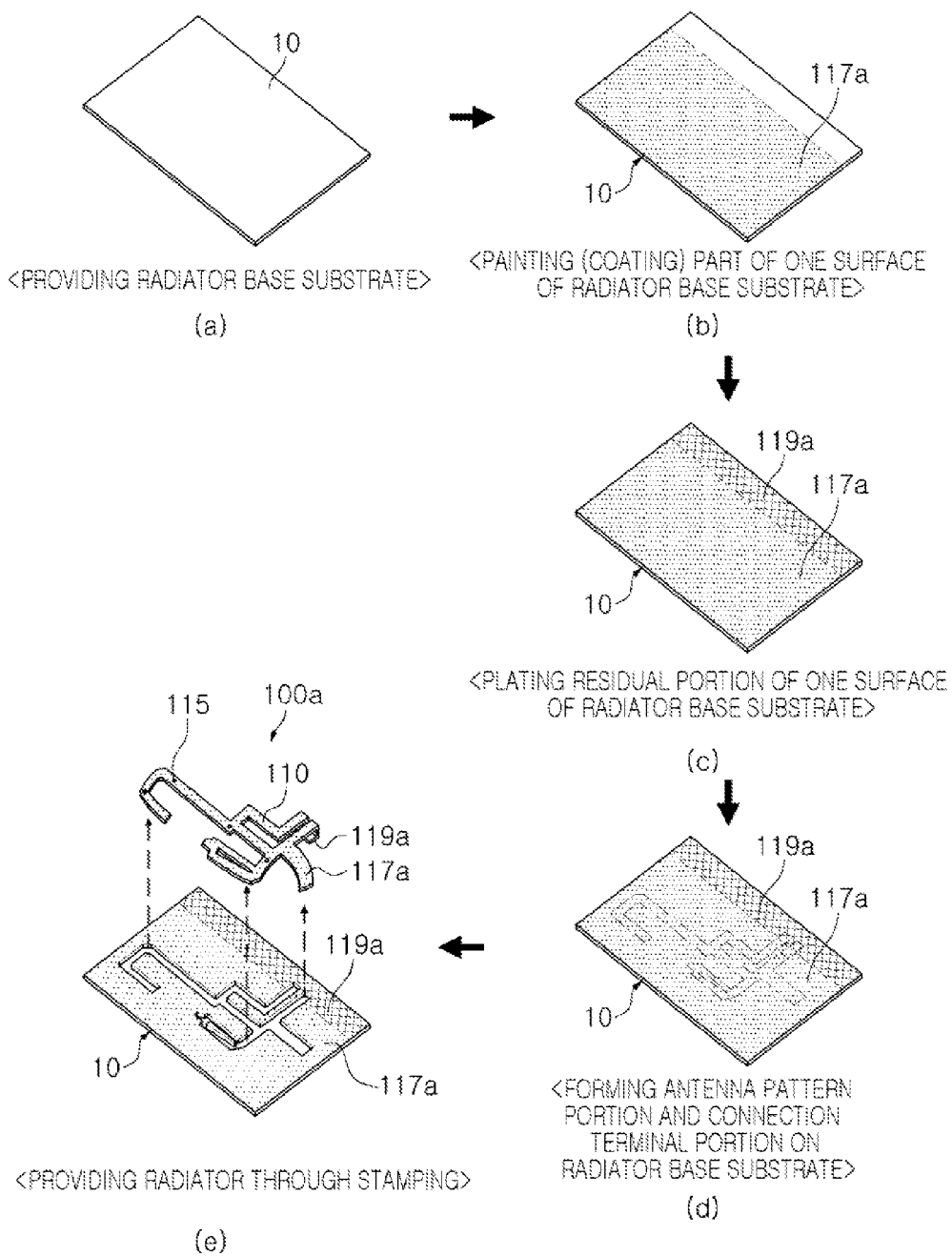
FIG. 13 is a schematic process diagram illustrating an example process of forming the radiator of FIG. 10.

FIG. 12 is a schematic cross-sectional view illustrating a shape in which the radiator is disposed between mold portions and surrounded with a resin material in a method of manufacturing the radiator frame 200a. FIG. 13 is a schematic process diagram illustrating an example process of forming the radiator 100a.

Referring to FIGS. 12 and 13, an example method of manufacturing the radiator frame 200a includes: providing a radiator base substrate 10; painting a part of one surface of the radiator base substrate 10; plating the entirety or a part of the residual portion of the one surface of the radiator base substrate 10; providing the radiator 100a by stamping the radiator base substrate 10 so that the antenna pattern portion 110 and a connection terminal portion 130a for electrically connecting the antenna pattern portion 110 and a circuit board are formed; placing the radiator in an internal space 350 of an upper mold portion 320 and/or a lower mold portion 340; combining the upper mold portion 320 and the lower mold portion 340 to form the manufacturing mold 300; and providing a resin material in the internal space 350 to form the molding frame 210, and embed the antenna pattern portion 110 in the molding frame 210 to form the radiator frame 200a, which allows the antenna pattern portion 110 to be installed in the case 420 of the terminal 400a. In this case, the antenna pattern portion 110 is formed at the painted portion, and the connection terminal portion 130a is formed at the plated portion. Aspects of the method of manufacturing the radiator frame 200a are described in greater detail below.

In the painting of a part of one surface of the radiator base substrate 10, the radiator base substrate 10 may be held (fixed) onto a predetermined jig, and thereafter a coating layer may be formed by jetting a painting liquid or a coating liquid while attaching protection tape onto the residual portion of the one surface of the radiator base substrate 10. Of course, the painting liquid or coating liquid may be applied only to the corresponding portion without attaching separate protection tape, and the like.

In this embodiment, it is desirable to form the coating layer 117a only on a part of one surface of the radiator base substrate 10. However, the painting liquid or coating liquid may be easily scattered in dust form and, as a result, the painting liquid or coating liquid may be partially applied onto another portion of the one surface of the radiator base substrate 10. Therefore, the coating layer 117a may be formed on a part of the one surface of the radiator base substrate 10 and, thereafter, the plated layer 119a may be formed on the entirety or a part of the residual portion of the one surface of the radiator base substrate 10. As a result, a part of the one surface of the radiator base substrate 10 may have overall conductivity.

Next, in the plating of the entirety or a part of the residual portion of the one surface of the radiator base substrate 10, the plated layer 119a made of at least one of nickel or gold, or different metallic materials, may be formed on the entirety or a part of the residual portion of the one surface of the radiator base substrate 10 having the coating layer 117a formed on a part of the one surface thereof. Therefore, in the painting of the radiator base substrate 10, although the coating liquid or painting liquid may be partially applied onto an undesired portion of the one surface of the radiator base substrate 10, the plated layer 119a covers the entirety of the corresponding surface. As a result, the residual portion of the one surface of the radiator base substrate 10 has overall conductivity provided by the plated layer 119a.

The radiator 100a may be formed by stamping the radiator base substrate 10 that passes through the plating of the radiator base substrate 10 so that the antenna pattern portion 110 transmitting or receiving the external signal and the connection terminal portion 130a electrically connecting the antenna pattern portion 110 and the circuit board 500 are formed. The antenna pattern portion 110 may be formed at the portion where the coating layer 117a is formed and the connection terminal portion 130a may be formed at the portion where the plated layer 119a is formed.

Further, in the providing of the radiator 100a by stamping the radiator base substrate 10, the radiator 100a may be provided with a 3D structure by bending each of the antenna pattern portion 110 and the connection terminal portion 130a, and the antenna pattern portion 110 and the connection terminal portion 130a may be bent and connected by the connection portion 120a.

After the radiator 100a is formed, the radiator 100a may be placed in the internal space 350 of the manufacturing mold 300.

The internal space 350 may be filled with the resin material so as to form the molding frame 210 with the antenna pattern portion 110 embedded therein. In this case, when the radiator 100a is mounted on the terminal 400a, a part of one surface of the radiator 100a (e.g., the portion where the coating layer 117a is formed) is exposed in an external direction (e.g., toward the first surface 210a of the molding frame 210) and the residual portion of the one surface of the radiator 100a (e.g., the portion where the plated layer 119a is formed) is exposed in an internal direction (e.g., toward the second surface 210b of the molding frame 210).

As set forth above, according to example embodiments in the present disclosure, a contact failure problem of an antenna and a substrate may be solved by preventing contact of a portion of the terminal part connected to the circuit board from being degraded, to thereby improve the performance of the antenna.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radiator frame comprising:
   a radiator comprising
   an antenna pattern portion configured to transmit or receive a signal, and
   a connection terminal portion configured to electrically connect the antenna pattern portion and a circuit board; and
   a molding frame connected to the radiator such that the antenna pattern portion is exposed at one surface of the molding frame and the connection terminal portion is exposed at another surface of the molding frame opposing the one surface of the molding frame,
   wherein the connection terminal portion includes a plated layer exposed at the other surface of the molding frame to contact the circuit board, and the radiator comprises a 3D structure bent to form the antenna pattern portion and the connection terminal portion; and a coating layer is disposed on an entirety of a first surface of the radiator including an exposed surface of the antenna pattern portion that is exposed at the one surface of the molding frame.

2. The radiator frame of claim 1, wherein the radiator comprises a coating layer on the antenna pattern portion, and the coating layer is exposed at the one surface of the molding frame.

3. The radiator frame of claim 2, wherein a painting liquid of a same material as a material of the coating layer is interposed between the connection terminal portion and the plated layer.

4. The radiator frame of claim 1, wherein the plated layer is constructed of metallic material having conductivity.

5. The radiator frame of claim 1, wherein:
the radiator comprises a connection portion extending from one end of the antenna pattern portion and connected to the connection terminal portion; and
one end of the connection portion is bent to one side of the antenna pattern portion, and the connection terminal portion is bent outwardly from another end of the connection portion in a direction opposite to a direction in which the antenna pattern portion is provided.

6. The radiator frame of claim 1, wherein:
the radiator comprises a 3D structure bent to form the antenna pattern portion and the connection terminal portion; and
the radiator comprises a coating layer only on an exposed surface of the antenna pattern portion exposed at the one surface of the molding frame.

7. The radiator frame of claim 6, wherein:
the radiator comprises a connection portion extending from one end of the antenna pattern portion and connected to the connection terminal portion; and
one end of the connection portion is bent to one side of the antenna pattern portion and the connection terminal portion is bent inwardly from another end of the connection portion in a direction in which the antenna pattern portion is provided.

8. The radiator frame of claim 6, wherein:
the radiator comprises a connection portion extending from one end of the antenna pattern portion and connected to the connection terminal portion; and
one end of the connection portion is bent to one side of the antenna pattern portion and the connection terminal portion is bent in an inner side from another end of the connection portion to oppose the antenna pattern portion.

9. The radiator frame of claim 1, wherein:
the radiator comprises a 3D structure bent to form the antenna pattern portion, the connection terminal portion, and a connection portion connecting the antenna pattern portion and the connection terminal portion; and
a coating layer is disposed on at least a portion of the antenna pattern portion and the connection terminal portion, and the coating layer is mostly disposed on a portion of the antenna pattern portion exposed at the one surface of the molding frame.

10. A radiator frame comprising:
a radiator comprising
an antenna pattern portion configured to transmit or receive a signal, and
a connection terminal portion configured to electrically connect the antenna pattern portion and a circuit board; and
a molding frame connected to the radiator such that the antenna pattern portion is exposed at one surface of the molding frame and the connection terminal portion is exposed at another surface of the molding frame opposing the one surface of the molding frame,
wherein the connection terminal portion includes a plated layer exposed at the other surface of the molding frame to contact the circuit board, and,
the radiator comprises a 3D structure bent to form the antenna pattern portion and the connection terminal portion; and
the radiator comprises the plated layer on an entirety of a second surface of the radiator including an exposed surface of the connection terminal portion exposed at the other surface of the molding frame.

11. The radiator frame of claim 10, wherein:
the radiator comprises a connection portion extending from one end of the antenna pattern portion and connected to the connection terminal portion; and
one end of the connection portion is bent to one side of the antenna pattern portion and the connection terminal portion is bent outwardly from another end of the connection portion, externally, such that the connection terminal portion does not include a portion facing the antenna pattern portion.

12. A radiator frame comprising:
a radiator comprising
an antenna pattern portion configured to transmit or receive a signal, and
a connection terminal portion configured to electrically connect the antenna pattern portion and a circuit board; and
a molding frame connected to the radiator such that the antenna pattern portion is exposed at one surface of the molding frame and the connection terminal portion is exposed at another surface of the molding frame opposing the one surface of the molding frame,
wherein the connection terminal portion includes a plated layer exposed at the other surface of the molding frame to contact the circuit board, and
the radiator comprises a 3D structure bent to form the antenna pattern portion and the connection terminal portion, and
the radiator comprises the plated layer only on an exposed surface of the connection terminal portion exposed at the other surface of the molding frame.

* * * * *